(12) United States Patent
Wang et al.

(10) Patent No.: US 11,228,463 B2
(45) Date of Patent: Jan. 18, 2022

(54) SOUNDING REFERENCE SIGNAL TRANSMISSION METHOD, BASE STATION, AND USER EQUIPMENT

(71) Applicant: NTT DOCOMO, INC., Tokyo (JP)

(72) Inventors: Xin Wang, Beijing (CN); Chongning Na, Beijing (CN); Lilin Dan, Beijing (CN); Jie Yang, Beijing (CN); Yi Zhang, Beijing (CN); Yue Xiao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 35 days.

(21) Appl. No.: 16/622,699

(22) PCT Filed: Jun. 15, 2018

(86) PCT No.: PCT/CN2018/091434
§ 371 (c)(1),
(2) Date: Dec. 13, 2019

(87) PCT Pub. No.: WO2018/228516
PCT Pub. Date: Dec. 20, 2018

(65) Prior Publication Data
US 2021/0144029 A1    May 13, 2021

(30) Foreign Application Priority Data
Jun. 15, 2017  (CN) .......................... 201710454045.X

(51) Int. Cl.
*H04W 72/04* (2009.01)
*H04L 25/02* (2006.01)
*H04L 5/00* (2006.01)

(52) U.S. Cl.
CPC ........ *H04L 25/0226* (2013.01); *H04L 5/0048* (2013.01); *H04L 5/0053* (2013.01); *H04L 5/0007* (2013.01); *H04W 72/042* (2013.01)

(58) Field of Classification Search
CPC ........... H04W 72/042; H04W 72/0413; H04W 76/27; H04W 72/0446; H04W 72/0453;
(Continued)

(56) References Cited

U.S. PATENT DOCUMENTS

2017/0048717 A1    2/2017  Yoo et al.
2017/0170943 A1*   6/2017  Zeng ................. H04W 52/0245
(Continued)

FOREIGN PATENT DOCUMENTS

CN    106713189 A      5/2017
WO    2016148795 A1    9/2016

OTHER PUBLICATIONS

International Search Report issued in International Application No. PCT/CN2018/091434, dated Sep. 7, 2018 (11 pages).
(Continued)

*Primary Examiner* — Eva Y Puente
(74) *Attorney, Agent, or Firm* — Osha Bergman Watanabe & Burton LLP

(57) ABSTRACT

An embodiment of the present invention provides a sounding reference signal (SRS) transmission method, a base station, and a user equipment, the SRS transmission method including: generating SRS configuration information for at least two UEs, such that an SRS of a first type of UE of the at least two UEs is non-orthogonal with an SRS of a second type of UE of the at least two UEs; transmitting the SRS configuration information of the at least two UEs.

11 Claims, 7 Drawing Sheets

(58) Field of Classification Search
CPC ............. H04W 74/0833; H04W 24/08; H04W 56/001; H04W 72/0493; H04W 24/10; H04W 72/1289; H04W 52/0216; H04L 5/0048; H04L 5/0051; H04L 5/0053; H04L 5/0023; H04L 5/001; H04L 25/0226; H04L 27/2613; H04L 5/0092; H04L 1/0003; H04L 25/0224; H04L 1/08; H04B 7/0626; H04B 7/0695; H04B 17/309; H04B 7/0617; H04B 17/318; H04B 7/0413; H04B 7/0632; H04B 7/0639; H04B 7/0404; H04B 7/0408; H04B 7/0486; H04B 7/0628
USPC ......................................................... 370/329
See application file for complete search history.

(56) References Cited

U.S. PATENT DOCUMENTS

| | | | |
|---|---|---|---|
| 2018/0070274 A1* | 3/2018 | Ode | H04W 36/08 |
| 2018/0309478 A1* | 10/2018 | Dang | H04B 7/0678 |
| 2019/0053241 A1* | 2/2019 | Zhang | H04W 72/0453 |
| 2019/0074876 A1* | 3/2019 | Kakishima | H04L 5/0035 |
| 2019/0363853 A1* | 11/2019 | Soriaga | H04L 5/0051 |
| 2020/0220676 A1* | 7/2020 | Xu | H04B 7/06 |
| 2020/0235961 A1* | 7/2020 | Kim | H04L 5/0053 |

OTHER PUBLICATIONS

International Preliminary Report on Patentability issued in International Application No. PCT/CN2018/091434; dated Dec. 17, 2019 (5 pages).

* cited by examiner

SOUNDING REFERENCE SIGNAL TRANSMISSION METHOD, BASE STATION, AND USER EQUIPMENT

CROSS-REFERENCE TO RELATED APPLICATIONS

This application is a 371 U.S. National State of International Application No. PCT/CN2018/091434, filed on Jun. 15, 2018, which claims priority to Chinese Application No. 201710454045.X, filed on Jun. 15, 2017. The entire disclosures of the above applications are incorporated herein by reference.

TECHNICAL FIELD

The present application relates to a field of communication technologies, and in particular, to a sounding reference signal transmission method, a base station, and a user equipment.

BACKGROUND

In the data transmission process of a wireless network, sounding reference signal (SRS) is a signal that a UE transmits to a base station to measure channel state and carry out channel estimation. Specifically, the UE transmits an uplink SRS according to an indication of the base station, and the base station judges uplink channel state information of the UE according to the received SRS, and carries out corresponding frequency domain selection scheduling, power control, and the like according to the obtained channel state information.

On the other hand, with the continuous development of wireless communication technologies, different types of UEs have been proposed. For example, in a 5G communication system, a UE that uses a wide bandwidth for data transmission is proposed. Compared with a conventional UE, the UE that uses a wide bandwidth for data transmission has advantages such as faster data transmission speed and the like. In the conventional SRS configuration method, the base station needs to configure the transmission resources of a plurality of UEs that need to transmit SRS in one time-frequency resource unit, so that the SRSs of the plurality of UEs are orthogonal. However, the number of SRS ports used to transmit SRS signals is limited and the requirement of the 5G communication system cannot be met.

SUMMARY OF THE INVENTION

According to embodiments of the present invention, it is desirable to be able to support more SRS ports with limited channel resources to further improve the capacity of the SRS.

According to one aspect of the present invention, a sounding reference signal (SRS) transmission method is provided, which is performed by a base station, comprising: generating SRS configuration information of for at least two UEs, such that an SRS of a first type of UEs of the at least two UEs is non-orthogonal with an SRS of a second type of UEs of the at least two UEs; transmitting the SRS configuration information of the at least two UEs.

According to another aspect of the present invention, a sounding reference signal (SRS) transmission method is provided, which is performed by a user equipment (UE), comprising: receiving SRS configuration information transmitted by a base station; obtaining an SRS configuration of the UE from the SRS configuration information, wherein an SRS of the UE is non-orthogonal with SRSs of other UEs; transmitting the SRS of the UE according to the SRS configuration information.

According to another aspect of the present invention, a sounding reference signal (SRS) transmission method is provided, which is performed by a user equipment (UE), comprising: receiving SRS configuration information transmitted by a base station, the SRS configuration information including information about basic blocks included in an SRS of the UE; transmitting the SRS of the UE according to the SRS configuration information.

According to still another aspect of the present invention, a base station is provided, comprising: a generating unit, configured to generate SRS configuration information for at least two UEs, such that an SRS of a first type of UE of the at least two UEs is non-orthogonal with an SRS of a second type of UE of the at least two UEs; a transmitting unit, configured to transmit the SRS configuration information of the at least two UEs.

According to a further aspect of the present invention, a user equipment (UE) is provided, comprising: a receiving unit, configured to receive SRS configuration information transmitted by the base station; an obtaining unit, configured to obtain an SRS configuration of the UE from the SRS configuration information, wherein an SRS of the UE is non-orthogonal with SRSs of other UEs; a transmitting unit, configured to transmit the SRS of the UE according to the SRS configuration information.

According to still another aspect of the present invention, a user equipment (UE) is provided, comprising: a receiving unit, configured to receive SRS configuration information transmitted by a base station, the SRS configuration information including information about basic blocks included in an SRS of the UE; a transmitting unit, configured to transmit the SRS of the UE according to the SRS configuration information.

With the SRS transmission method, base station and user equipment according to the above aspect of the present invention, the SRS reference signal sequence of at least two UEs may be configured to be non-orthogonal, so that more UEs may be allowed to transmit SRS for channel measurement with given channel resources, thereby effectively improving the capacity of the SRS.

BRIEF DESCRIPTION OF THE DRAWINGS

The above and other objects, features and advantages of the present invention will become more apparent by describing the embodiments of the present invention in detail in conjunction with the drawings.

DESCRIPTION OF THE EMBODIMENTS

Figure 1:
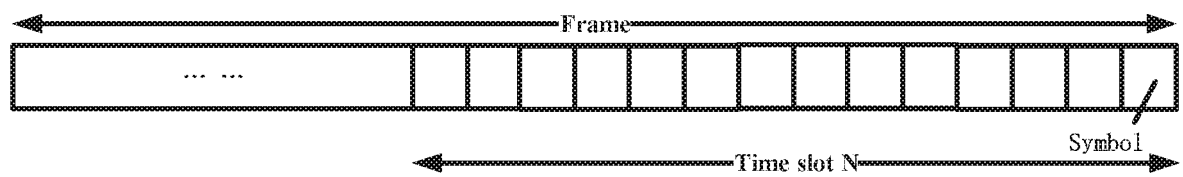
FIG. 1 shows a schematic diagram of a frame structure in a communication system according to one example of the present invention.

An SRS transmission method, a base station, and a user equipment according to embodiments of the present invention will be described below with reference to the drawings. In the drawings, the same reference numerals always refer to the same elements. It should be understood that the embodiments described herein are illustrative only and are not intended to limit the scope of the present invention.

In a wireless system according to the embodiments of the present invention, a sounding reference signal (SRS) transmitted by the UE in the uplink may enable the base station to estimate an uplink channel quality of different frequency bands, so as to measure and/or monitor the channel. FIG. 1 shows a schematic diagram of a frame structure in a communication system according to one example of the present invention. One frame is composed of a plurality of time slots, and each time slot contains 7 or 14 symbols. In the frame structure shown in FIG. 1, the sounding reference signal SRS will be transmitted on the last one or more (e.g., 2 or 4) symbols of the 14 symbols of time slot N.

Figure 2:
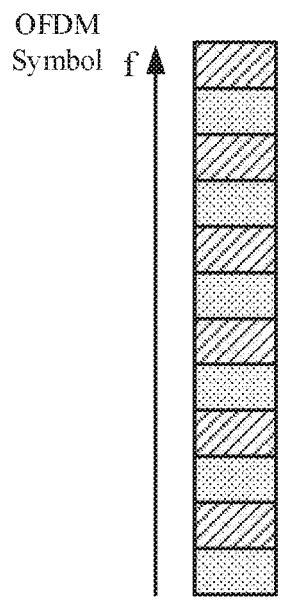
FIG. 2 shows one example of a frequency domain transmission distribution of SRSs of different UEs.
Figure 3:
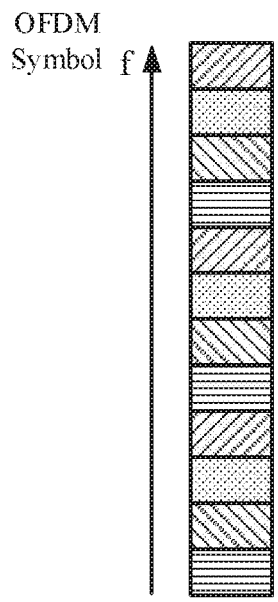
FIG. 3 shows another example of a frequency domain transmission distribution of SRSs of different UEs.

In existing communication systems, SRSs between different UEs may all be considered to be transmitted on a same resource block (RB) set of a same subframe. Under this premise, in order to improve an accuracy of channel estimation and ensure a precision of channel measurement, reference signal sequences of SRSs between different UEs may be distinguished with different "combs" in a frequency domain based on interleaved frequency-division multiple-access (IFDMA). FIG. 2 shows one example of a frequency domain transmission distribution of SRSs of different UEs on an OFDM symbol in FIG. 1. Shaded hatched portions show subcarriers for SRS transmission of a certain UE, and dotted shaded portions show subcarriers for SRS transmission of another UE. That is to say, the reference signal sequences of the SRSs of the two UEs are mapped every other subcarrier, thereby forming a "comb" spectrum, and at this time, the comb numbers of the SRSs of the two UEs are both 2. FIG. 3 shows another example of the frequency domain transmission distribution of the SRSs of different UEs on the OFDM symbols in FIG. 1. Four kinds of shades from top to bottom respectively show four different subcarriers for SRS transmission of four UEs, and also form a "comb" spectrum. At this time, the comb numbers of the SRSs of the four UEs are all 4. In the above examples of FIG. 2 and FIG. 3, regardless of whether the comb number is 2 or 4, the reference signal sequences of the SRSs between different UEs are completely non-overlapping in the frequency domain, that is, completely orthogonal, and the signals transmitted by the reference signal sequences of the UEs are independent and do not interfere with each other.

Although the transmission distribution of the SRSs of different UEs in the frequency domain shown in FIG. 2 and FIG. 3 may ensure the accuracy of the channel estimation, it has a large limitation on the capacity of the SRS. In 5G new radio technologies, it is desirable to be able to support more antenna ports on the UE side, which requires more SRS resources to allow more UEs to transmit SRS for channel measurements. Therefore, inventors of the present application consider using non-orthogonal SRS reference signal sequences between different UEs to improve the capacity of the SRS.

Figure 4:
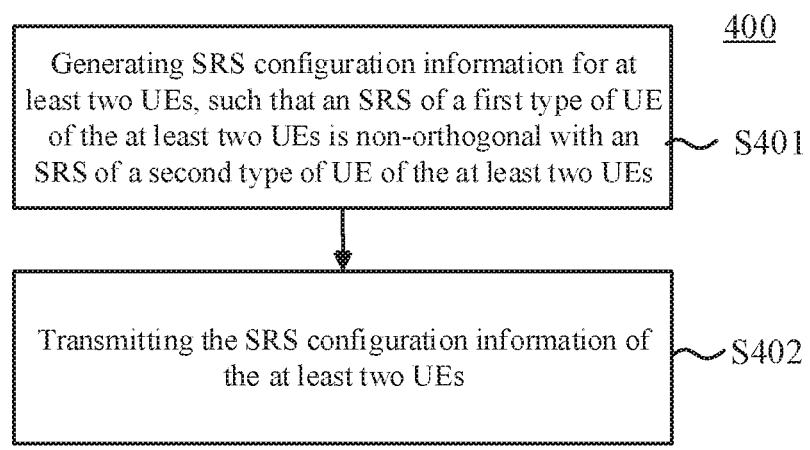
FIG. 4 shows a flowchart of an SRS transmission method according to an embodiment of the present invention.

Specifically, the embodiments of the present invention provide a sounding reference signal transmission method, which is performed by a base station. FIG. 4 shows a flowchart of an SRS transmission method 400 according to the embodiments of the present invention.

As described in FIG. 4, in step S401, SRS configuration information of at least two UEs is generated, such that an SRS of a first type of UE of the at least two UEs is non-orthogonal with an SRS of a second type of UE of the at least two UEs.

In one embodiment of the present invention, the at least two UEs may include at least one first type of UE and at least one second type of UE. In addition, the SRS of the first type of UE of the at least two UEs being non-orthogonal with the SRS of the second type of UE of the at least two UEs may include that the SRS of the first type of UE and the SRS of the second type of UE are partially orthogonal, that is, subcarriers that transmit the SRS of the first type of UE and the SRS of the second type of UE may partially overlap, thereby improving the SRS capacity.

In one embodiment of the present invention, a bandwidth of the SRS of the first type of UE is greater than a bandwidth of the SRS of the second type of UE. That is, the SRS of the first type of UE may be a wideband SRS, and the SRS of the second type of UE may be a narrowband SRS. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS.

Figure 5:
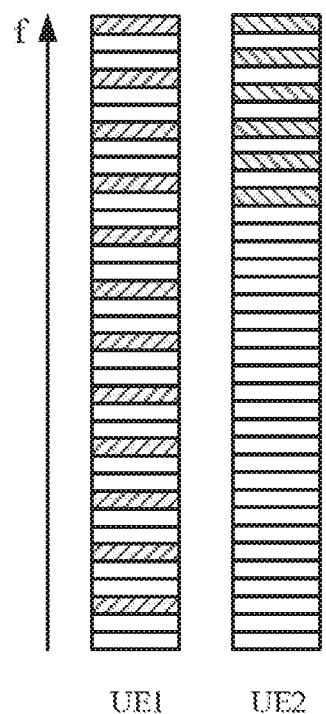
FIG. 5 shows a schematic diagram of a SRS reference signal sequence configuration of an SRS of a first type of UEs and a second type of UEs.

In another embodiment of the present invention, the non-orthogonality between the reference signal sequences of the SRS of the first type of UE and the second type of UE may be implemented by setting the comb number of the SRS of the first type of UE to be different from the comb number of the SRS of the second type of UE. FIG. 5 shows an example of a comb number setting of the SRS of the first type of UE (UE1) and the SRS of the second type of UE (UE2). As shown in FIG. 5, the comb number of the SRS of the first type of UE may be set to 2, and the comb number of the second type of UE may be set to 3. At this time, the same subcarrier on the same time-frequency resource unit may not only be used to transmit the SRS of the first type of UE, but also be used to transmit the SRS of the second type of UE. In this case, the SRS of the first type of UE and the SRS of the second type of UE are not completely orthogonal. Alternatively, the comb number of the SRS of the first type of UE and the comb number of the SRS of the second type of UE may be relatively prime, such that not all subcarriers simultaneously carry the SRS of the first type of UE and the second type of UE, but there may be subcarriers that carry the SRS of the first type of UE and the SRS of the second type of UE, respectively, so as to achieve interference randomization processing between the SRSs of different UEs, which is beneficial to the facilitation of accuracy of the subsequent channel estimation of the SRS of each UE by the base station. For example, the comb number of the SRS of the first type of UE may take a value of 3 or 5 and so on, and the comb number of the SRS of the second type of UE may take a value of 2 or 4 and so on, which is relatively prime with the value of 3 or 5.

Figure 6:
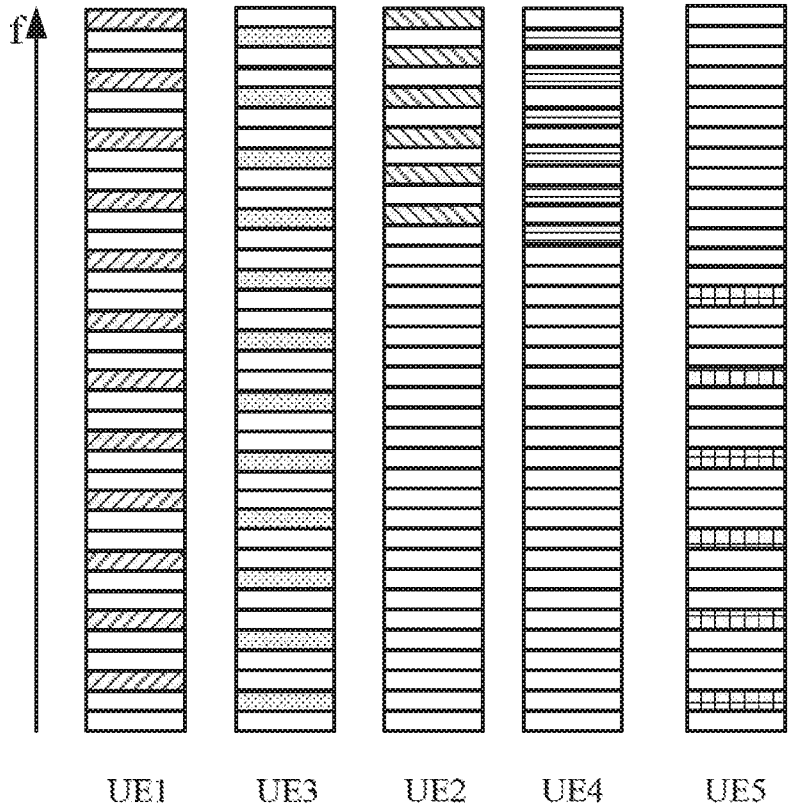
FIG. 6 shows a schematic diagram of a SRS reference signal sequence configuration with two first type of UEs and three second type of UEs, respectively.

In another embodiment of the present invention, when there are a plurality of first type of UEs, the SRSs of the respective first type of UEs may be orthogonal to each other. In addition, when there are a plurality of second type of UEs, the SRSs of the UEs of the second type may also be orthogonal to each other. FIG. 6 shows a schematic diagram of an SRS configuration with two first type of UEs (UE1, UE3) and three second type of UEs (UE2, UE4, UE5), respectively. The comb numbers of UE1 and UE3 are both 3, and the comb numbers of UE2 and UE4 are both 2, and the comb number of UE5 is 4. It can be seen from FIG. 6 that the two wideband SRSs of UE1 and UE3 are orthogonal to each other, and the three narrowband SRSs of UE2, UE4 and UE5 are also orthogonal to each other, respectively. However, the two groups of SRS of the wideband UEs (UE1, UE3) and the narrowband UEs (UE2, UE4, UE5) are pairwise non-orthogonal, and there are subcarriers that carry any two SRSs in the two groups on the frequency domain at the same time.

The embodiments in which the SRSs of UEs with different bandwidths are configured by different comb numbers to implement non-orthogonal SRSs between different UEs are illustrated with FIG. 5 and FIG. 6 above. In the above example, the configuration information of the SRS configured by the base station may include information such as a bandwidth of the SRS and/or an interval information indicating the comb number. In one embodiment of the present invention, the bandwidth of the SRS may be represented with time-frequency resource units, where the time-frequency resource unit may be a given time-frequency resource with preset definition. Alternatively, one time-frequency resource unit may be one or more resource blocks (RBs) in the LTE system or NR. After the UE receives the SRS configuration information transmitted by the base station, the SRS may be transmitted according to the configured corresponding SRS reference signal sequence. The base station may transmit the SRS configuration information through higher layer signaling (such as RRC, MAC CE) or physical layer signaling (lower layer control information). In another embodiment of the present invention, the base station may select a configuration manner of the SRS reference signal sequence according to the SRS bandwidth type of the UE. For example, for narrowband SRS, the base station may select a shorter root sequence to configure the SRS, for example, a ZC (Zadoff-Chu) sequence of length 31 used in LTE may be selected; and for wideband SRS, the base station may select a longer root sequence, for example, a ZC sequence of length 61, to configure the SRS. The actually transmitted sequence may be obtained by cyclic shifting (CS) based on the ZC sequence of the above length.

In another embodiment of the present invention, the SRS of the UE configured by the base station may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the triggering by the base station, the corresponding UE transmits the SRS only once.

In another embodiment of the present invention, when the basic unit in the frequency domain transmitted by the SRS of the UE is a basic block, the base station may generate, according to the information of the basic block, SRS configuration information of any one or more UEs of the at least two UEs. The bandwidth information in the SRS configuration information configured by the base station may include the information of the basic block included in the SRS, and specifically may be a length of the basic block and the number of basic blocks. Then, the base station may determine the SRS reference signal sequences of the corresponding one or more UEs according to the determined length of the basic block and the number of basic blocks. For example, the base station may self-configure the SRS reference signal sequence of the UE according to the length and the number of the basic block(s), and notify the UE. Alternatively, the UE may directly transmit the SRS according to the preset sequence configuration corresponding to the length and the number of the basic block(s). The length information of the basic block or the configuration of the preset SRS reference signal sequence may be notified to the UE by the base station in advance, or may be written in a standard or transmitted with a signaling. When a length type of the basic block has been preset in the SRS configuration, an instruction corresponding one to one to the length type of the basic block (such as the configuration ID) needs to be used to indicate the length of the basic block.

When the basic structural unit of the transmission of the SRS in the frequency domain is the basic block, similar to the foregoing, the at least two UEs may also include at least one first type of UE and at least one second type of UE, and the bandwidth of the SRS of the first type of UE is greater than the bandwidth of the SRS of the second type of UE. That is, the SRS of the first type of UE may be a wideband SRS, and the SRS of the second type of UE may be a narrowband SRS. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS. The basic block used to configure the SRS of the first type of UE may be a first basic block, and the basic block used to configure the SRS of the second type of UE may be a second basic block.

In another embodiment of the present invention, when the basic structural unit of the transmission of the SRS in the frequency domain is the basic block, the SRS transmission sequence of each basic block may be constructed based on a ZC sequence of a given length, for example, the ZC sequence of length 31. The SRS transmission sequence on each basis block may be obtained by cyclic shifting the ZC sequence.

In another embodiment of the present invention, the length of the basic block may be the same as or different from the length of the time-frequency resource unit. For example, the length of one basic block may include one or more time-frequency resource units. Of course, the length of the basic block may be the same as or different from the resource block (RB). For example, one basic block may be one RB, or may be an integer multiple of RB. In one embodiment of the present invention, only the SRS configuration information of the first type of UE may be generated according to the information of the basic block; or the SRS configuration information of the second type of UE may be generated according to the information of the basic block. Of course, in another embodiment of the present invention, the SRS configuration information of the first type of UE and the second type of UE may be generated according to the same as or different basic block information, respectively. In another embodiment of the present invention, when the SRS of the first type of UE and the SRS of the second type of UE are both configured according to the basic block, the length of the first basic block used to configure the SRS of the first type of UE may be the same as or different from the length of the second basic block used to configure the SRS of the second type of UE. In addition, the number of the first basic block may be the same as or different from the number of the second basic block. Moreover, in another embodiment of the present invention, regardless of whether the length and/or the number of the first basic block and the second basic block are the same or different, the Non-orthogonal SRS of the first type of UEs and the second type of UEs all may be realized with the different comb numbers described above.

Figure 7:
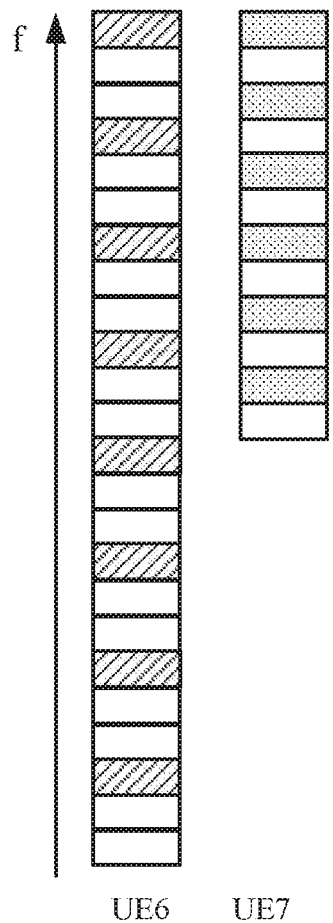
FIG. 7 shows an example of achieving a non-orthogonal SRS configuration of a UE of two block structures with different comb numbers.

FIG. 7 shows an example of achieving a non-orthogonal SRS configuration of the first type of UE and the second type of UE with different comb numbers when the length of the first basis block for configuring the SRS of the first type of UE (UE6) is different from the second basis block for configuring the SRS of the second type of UE (UE7), but the number of the first basis block for configuring the SRS of the first type of UE (UE6) is the same as the second basis block for configuring the SRS of the second type of UE (UE7). The length of the first basic block for configuring the UE6 is twice the length of the second basic block for configuring the UE7, the comb number of the UE6 is 3, and the comb number of the UE7 is 2. In the embodiment shown in FIG. 7, the length of the second basic block for configuring the UE7 may be 1 RB. Accordingly, the length of the first basic block for configuring the UE6 may be 2 RBs. Alternatively, the comb number of the SRS of the first type of UE and the comb number of the SRS of the second type of UE may be relatively prime, such that not all subcarriers simultaneously carry the SRS of the first type of UE and the second type of UE, but there may be subcarriers that carry the SRS of the first type of UE and the SRS of the second type of UE, respectively, so as to achieve interference randomization processing between the SRSs of different UEs, which is beneficial to the subsequent channel estimation of the SRS of each UE by the base station. For example, the comb number of the SRS of the first type of UE may take a value of 3 or 5 and so on, and the comb number of the SRS of the second type of UE may take a value of 2 or 4 and so on, which is relatively prime with the value of 3 or 5.

In another embodiment of the present invention, when the basic structural unit of the transmission of the SRS in the frequency domain is the first basic block or the second basic block, the SRS transmission sequence of each basic block may be constructed based on a ZC sequence of different given lengths. For example, the first basis block uses the ZC sequence of length 61, and the second basis block uses the ZC sequence of length 31. The SRS transmission sequence on each basis block may be obtained by cyclic shifting of the ZC sequence. In another embodiment of the present invention, under the premise that the basic structural unit of the transmission of the SRS in the frequency domain is the basic block, when there are a plurality of first type of UEs, the SRSs of the respective first type of UEs may be orthogonal to each other. The lengths and/or numbers of the basic blocks configuring the plurality of first type of UEs may be the same as or different from each other. In addition, when there are a plurality of second type of UEs, the SRSs of the respective second type of UEs may be orthogonal to each other. Likewise, the lengths and/or numbers of the basic blocks configuring the plurality of second type of UEs may also be the same as or different from each other.

In the above example of configuring the SRS according to the basic block, the configuration information of the SRS configured by the base station may include information such as the length of the basic block of the SRS, the number of basic blocks, and/or the interval information indicating the comb number. After receiving the SRS configuration information transmitted by the base station, the UE may transmit the SRS according to the configured corresponding SRS reference signal sequence. The base station may transmit the SRS configuration information through higher layer signaling (such as RRC, MAC CE) or physical layer signaling (lower layer control information). In another embodiment of the present invention, the base station may select a configuration manner of the SRS reference signal sequence according to the SRS bandwidth type of the UE. For example, for narrowband SRS, the base station may select a shorter root sequence to configure the SRS, for example, a ZC (Zadoff-Chu) sequence of length 31 used in LTE may be selected; and for wideband SRS, the base station may select a longer root sequence, for example, a ZC sequence of length 61, to configure the SRS. The actually transmitted sequence may be obtained by cyclic shifting (CS) based on the ZC sequence of the above length.

In another embodiment of the present invention, the SRS of the UE configured by the base station may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the triggering by the base station, the corresponding UE transmits the SRS only once.

Returning to FIG. 4, in step S402, the SRS configuration information of the at least two UEs is transmitted.

In this step, after the base station transmits the SRS configuration information to the at least two UEs, the corresponding UE may transmit the SRS according to the SRS configuration information, so that the base station carries out the channel estimation. Since the SRSs of different UEs are non-orthogonal in the embodiments of the present invention, the base station may carry out the channel estimation for the received SRSs of the at least two UEs with the successive interference cancellation (SIC) method after receiving the SRSs of the at least two UEs, thereby improving the accuracy of the estimation. For example, the base station may first estimate the SRS of the first type of UE, and delete the SRS of the first type of UE after the estimation, and then estimate the SRS of the second type of UE. When there are a plurality of first type of UEs or a plurality of second type of UEs, in the process of channel estimating by the base station, the SRSs of different UEs may be deleted one by one according to the quality of the received signal.

The SRS transmission method according to the embodiments of the present invention may configure the SRS reference signal sequence of at least two UEs to be non-orthogonal, so that more UEs may be allowed to transmit SRS for channel measurement with given channel resources, thereby effectively improving the capacity of the SRS.

Figure 8:
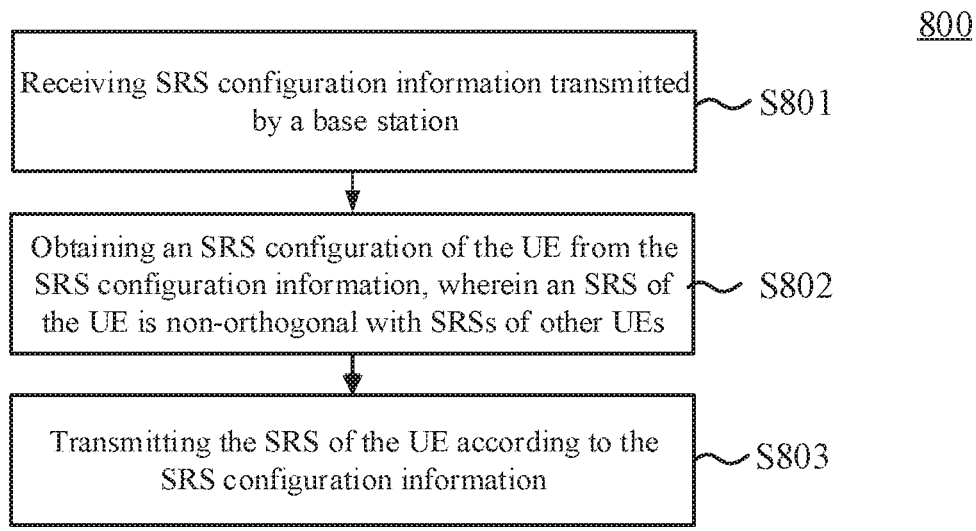
FIG. 8 shows a flowchart of an SRS transmission method according to another embodiment of the present invention.

The embodiments of the invention further provides a sounding reference signal transmission method, which is performed by a UE. FIG. 8 shows a flowchart of an SRS transmission method 800 according to embodiments of the present invention.

As shown in FIG. 8, in step S801, SRS configuration information transmitted by a base station is received.

In step S802, an SRS configuration of the UE is obtained from the SRS configuration information, where an SRS of the UE is non-orthogonal with SRSs of other UEs.

In the SRS configuration information transmitted by the base station, the base station may achieve the purpose of improving the SRS capacity in a case of given channel resources by configuring the SRS of at least two UEs so that the SRS of the UE is non-orthogonal with the SRSs of other UEs. Specifically, the SRS of the UE and the SRS of other UEs may be partially orthogonal, that is, the subcarriers that transmit the SRS of UE may partially overlap with the subcarriers that transmit the SRSs of other UEs.

In one embodiment of the present invention, the SRS of the UE may be a wideband SRS, of course, also may be a narrowband SRS. When the SRS of the UE is the wideband SRS, the SRS of the other UEs may be the narrowband SRSs; and when the SRS of the UE is the narrowband SRS, the SRS of the other UEs may be the wideband SRSs. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS.

In step S803, the SRS of the UE is transmitted according to the SRS configuration information.

In this step, the UE may transmit the SRS according to a SRS reference signal sequence corresponding to the SRS configuration information. As described above, the configuration of the SRS reference signal sequence by the base station may be notified to the UE by the base station in advance, or may be written in a standard or transmitted with a signaling, so that the UE learns the configured corresponding SRS reference signal sequence.

The SRS transmission method according to the embodiments of the present invention may enable the base station to configure the SRS reference signal sequence of at least two UEs to be non-orthogonal, so that more UEs may be allowed to transmit SRS for channel measurement with given channel resources, thereby effectively improving the capacity of the SRS.

Figure 9:
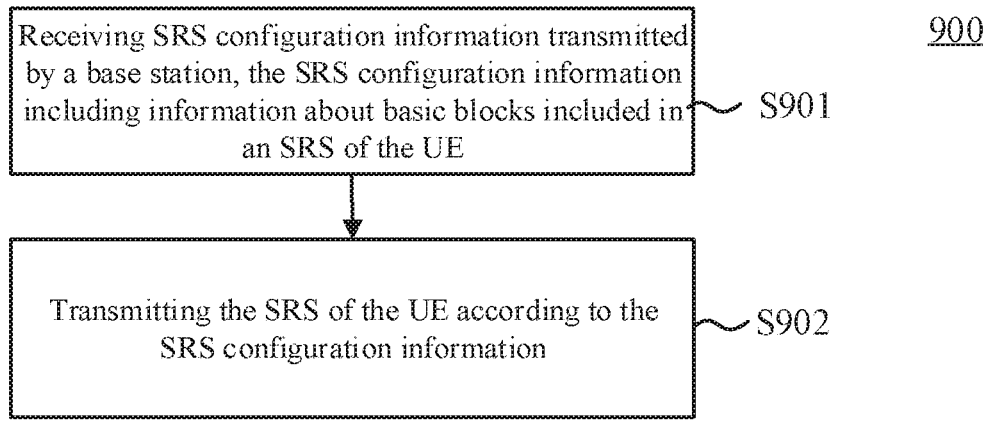
FIG. 9 shows a flowchart of an SRS transmission method according to another embodiment of the present invention.

The embodiments of the invention further provides a sounding reference signal transmission method, which is performed by a UE. FIG. 9 shows a flowchart of an SRS transmission method 900 according to an embodiment of the present invention.

As shown in FIG. 9, in step S901, SRS configuration information transmitted by a base station is received, the SRS configuration information including information about basic blocks included in an SRS of the UE.

When the basic structural unit of the transmission of the SRS in the frequency domain is the basic block, bandwidth information in the SRS configuration information of the UE configured by the base station may include the information of the basic block included in the SRS, and specifically, may include a length of the basic block, and the number of basis blocks. At this time, the base station may determine a SRS reference signal sequence of the corresponding one or more UEs according to the determined length of the basic block and the number of basic blocks. For example, the base station may self-configure the SRS reference signal sequence of the UE according to the length and the number of the basic block(s), and notify the UE. Alternatively, the UE may directly transmit the SRS according to the preset sequence configuration corresponding to the length and the number of the basic block(s). The length of the basic block or the configuration of the preset SRS reference signal sequence may be notified to the UE by the base station in advance, or may be written in a standard or transmitted with a signaling. For example, when a length type of the basic block has been preset in the SRS configuration, an instruction corresponding one to one to the length type of the basic block (such as the configuration ID) needs to be used to indicate the length of the basic block.

In another embodiment of the present invention, when the SRS is configured according to a basic block unit, the length of the basic block may be the same as or different from the length of the time-frequency resource unit, for example, the length of one basic block may include one or more time-frequency resource units. Of course, the length of the basic block may be the same as or different from the resource block (RB). For example, one basic block may be one RB, or may be an integer multiple of RB.

In one example of the present invention, the configuration information of the SRS configured by the base station may include not only the length of the basic block of the SRS, the number of basic blocks, but also information such as the interval information indicating the comb number. The base station may transmit the SRS configuration information through higher layer signaling (such as RRC, MAC CE) or physical layer signaling (lower layer control information).

In another embodiment of the present invention, the SRS of the UE configured by the base station may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the base station triggering, the corresponding UE transmits the SRS only once.

In step S902, the SRS of the UE is transmitted according to the SRS configuration information.

In this step, after receiving the SRS configuration information transmitted by the base station, the UE may transmit the SRS according to the corresponding SRS reference signal sequence. As described above, the configuration of the SRS reference signal sequence by the base station may be notified to the UE by the base station in advance, or may be written in a standard or transmitted with a signaling, so that the UE learns the configured corresponding SRS reference signal sequence.

The SRS transmission method according to the embodiments of the present invention may enable the base station to configure the SRS reference signal sequence of at least two UEs to be non-orthogonal, so that more UEs may be allowed to transmit SRS for channel measurement with given channel resources, thereby effectively improving the capacity of the SRS.

Next, a base station according to embodiments of the present invention will be described with reference to FIG. 10. The base station may perform the above SRS transmission method. Since the operation of the base station is substantially the same as the steps of the SRS transmission method described above, only a brief description thereof will be made herein, and a repeated description of the same details will be omitted.

Figure 10:
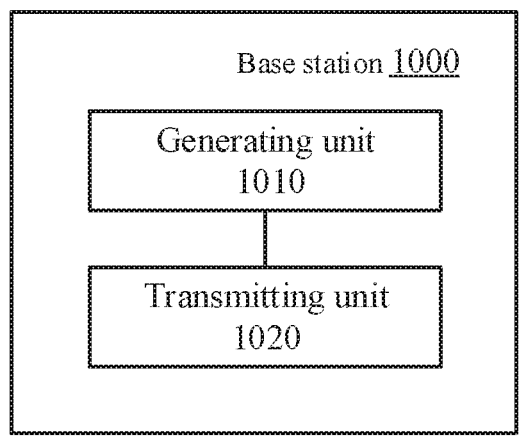
FIG. 10 shows a block diagram of a structure of a base station according to one embodiment of the present invention.

As shown in FIG. 10, a base station 1000 includes a generating unit 1010 and a transmitting unit 1020. It will be appreciated that FIG. 10 only shows components related to embodiments of the present invention, while other components are omitted, but this is merely illustrative, and the base station 1000 may include other components as needed.

The generating unit 1010 generates SRS configuration information for at least two UEs, such that an SRS of a first type of UE of the at least two UEs is non-orthogonal with an SRS of a second type of UEs of the at least two UEs.

In one embodiment of the present invention, the at least two UEs may include at least one first type of UE and at least one second type of UE. The generating unit 1010 may achieve the purpose of improving the SRS capacity in a case of given channel resources by configuring the SRS of at least two UEs so that the SRS of the first type of UE is non-orthogonal with the SRS of the second type of UE. Specifically, the SRS of the first type of UE and the SRS of the second type of UE may be partially orthogonal, that is, the subcarriers that transmit the SRS of the first type of UE may partially overlap with the subcarriers that transmit the SRS of the second type of UE.

In one embodiment of the present invention, a bandwidth of the SRS of the first type of UE is greater than a bandwidth of the SRS of the second type of UE. That is, the SRS of the first type of UE may be a wideband SRS, and the SRS of the second type of UE may be a narrowband SRS. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS.

In another embodiment of the present invention, the generating unit 1010 may implement non-orthogonality between the reference signal sequences of the SRS of the first type of UE and the second type of UE by setting the comb number of the SRS of the first type of UE to be different from the comb number of the SRS of the second type of UE. FIG. 5 shows an example of a comb number setting of the SRS of the first type of UE (UE1) and the SRS of the second type of UE (UE2). As shown in FIG. 5, the comb number of the SRS of the first type of UE may be set to 2, and the comb number of the second type of UE may be set to 3. At this time, the same subcarrier on the same time-frequency resource unit may not only be used to transmit the SRS of the first type of UE, but also be used to transmit the SRS of the second type of UE. In this case, the SRS of the first type of UE and the SRS of the second type of UE are not completely orthogonal. Alternatively, the comb number of the SRS of the first type of UE and the comb number of the SRS of the second type of UE may be relatively prime, such that not all subcarriers simultaneously carry the SRS of the first type of UE and the second type of UE, but there may be subcarriers that carry the SRS of the first type of UE and the SRS of the second type of UE, respectively, so as to achieve interference randomization processing between the SRSs of different UEs, which is beneficial to the facilitation of accuracy of the subsequent channel estimation of the SRS of each UE by the base station. For example, the comb number of the SRS of the first type of UE may take a value of 3 or 5 and so on, and the comb number of the SRS of the second type of UE may take a value of 2 or 4 and so on, which is relatively prime with the value of 3 or 5.

In another embodiment of the present invention, when there are a plurality of first type of UEs, the SRSs of the respective first type of UEs may be orthogonal to each other. In addition, when there are a plurality of second type of UEs, the SRSs of the UEs of the second type may also be orthogonal to each other. FIG. 6 shows a schematic diagram of an SRS configuration with two first type of UEs (UE1, UE3) and three second type of UEs (UE2, UE4, UE5), respectively. The comb numbers of UE1 and UE3 are both 3, and the comb numbers of UE2 and UE4 are both 2, and the comb number of UE5 is 4. It can be seen from FIG. 6 that the two wideband SRSs of UE1 and UE3 are orthogonal to each other, and the three narrowband SRSs of UE2, UE4 and UE5 are also orthogonal to each other, respectively. However, the two groups of SRS of the wideband UEs (UE1, UE3) and the narrowband UEs (UE2, UE4, UE5) are pairwise non-orthogonal, and there are subcarriers that carry any two SRSs in the two groups on the frequency domain at the same time.

The embodiments in which the SRSs of UEs with different bandwidths are configured by the generating unit 1010 through different comb numbers to implement non-orthogonal SRSs between different UEs are illustrated with FIG. 5 and FIG. 6 above. In the above example, the configuration information of the SRS configured by the generating unit 1010 may include information such as a bandwidth of the SRS and/or an interval information indicating the comb number. In one embodiment of the present invention, the bandwidth of the SRS may be represented with time-frequency resource units, where the time-frequency resource unit may be a given time-frequency resource with preset definition. Alternatively, one time-frequency resource unit may be one or more resource blocks (RBs) in the LTE system or NR. In another embodiment of the present invention, the generating unit 1010 may select a configuration manner of the SRS reference signal sequence according to the SRS bandwidth type of the UE. For example, for narrowband SRS, the generating unit 1010 may select a shorter root sequence to configure the SRS, for example, a ZC (Zadoff-Chu) sequence of length 31 used in LTE may be selected; and for wideband SRS, the generating unit 1010 may select a longer root sequence, for example, a ZC sequence of length 61, to configure the SRS. The actually transmitted sequence may be obtained by cyclic shifting (CS) based on the ZC sequence of the above length.

In another embodiment of the present invention, the SRS of the UE configured by the generating unit 1010 may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the triggering by the base station, the corresponding UE transmits the SRS only once.

In another embodiment of the present invention, when the basic unit constituting the SRS of the UE is the basic block, the generating unit 1010 may generate, according to the information of the basic block, SRS configuration information of any one or more UEs of the at least two UEs. The bandwidth information in the SRS configuration information configured by the generating unit 1010 may include information of the basic block included in the SRS, specifically, a length of the basic block and the number of basic blocks. Then, the generating unit 1010 may determine the SRS reference signal sequences of the corresponding one or more UEs according to the determined length of the basic block and the number of basic blocks. For example, the generating unit 1010 may self-configure the SRS reference signal sequence of the UE according to the length and the number of the basic block(s), and notify the UE. Alternatively, the UE may directly transmit the SRS according to the preset sequence configuration corresponding to the length and the number of the basic block(s). The length information of the basic block or the configuration of the preset SRS reference signal sequence may be notified to the UE by the base station in advance, or may be written in a standard or transmitted with a signaling. When a length type of the basic block has been preset in the SRS configuration, the generating unit 1010 needs to indicate the length of the basic block by using an instruction corresponding one to one to the length type of the basic block (such as the configuration ID).

When the basic structural unit of the transmission of the SRS in the frequency domain is the basic block, similar to the foregoing, the at least two UEs may also include at least one first type of UEs and at least one second type of UEs, and the bandwidth of the SRS of the first type of UEs is greater than the bandwidth of the SRS of the second type of UEs. That is, the SRS of the first type of UEs may be a wideband SRS, and the SRS of the second type of UEs may be a narrowband SRS. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS. The basic block used to configure the SRS of the first type of UEs may be a first basic block, and the basic block used to configure the SRS of the second type of UEs may be a second basic block. In another embodiment of the present invention, the length of the basic block may be the same as or different from the length of the time-frequency resource unit. For example, the length of one basic block may include one or more time-frequency resource units. Of course, the length of the basic block may be the same as or different from the resource block (RB). For example, one basic block may be one RB, or may be an integer multiple of RB. In one embodiment of the present invention, the generating unit 1010 may generate only the SRS configuration information of the first type of UE according to the information of the basic block; or generate only the SRS configuration information of the second type of UE according to the information of the basic block. Of course, in another embodiment of the present invention, the generating unit 1010 may also generate SRS configuration information of the first type of UE and the second type of UE respectively according to the same as or different basic block information. In another embodiment of the present invention, when the SRS of the first type of UE and the SRS of the second type of UE are both configured according to a basic block, the length of the first basic block used to configure the SRS of the first type of UE by the generating unit 1010 may be the same as or different from the length of the second basic block used to configure the SRS of the second type of UE. In addition, the number of the first basic block may be the same as or different from the number of the second basic block. In addition, in another embodiment of the present invention, regardless of whether the length and/or the number of the first basic block and the second basic block are the same or different, the Non-orthogonal SRS of the first type of UEs and the second type of UEs all may be realized by the generating unit 1010 with the different comb numbers described above.

FIG. 7 shows an example of achieving a non-orthogonal SRS configuration of the first type of UE and the second type of UE with different comb numbers when the length of the first basis block for configuring the SRS of the first type of UE (UE6) is different from the second basis block for configuring the SRS of the second type of UE (UE7), but the number of the first basis block for configuring the SRS of the first type of UE (UE6) is the same as the second basis block for configuring the SRS of the second type of UE (UE7). The length of the first basic block for configuring the UE6 is twice the length of the second basic block for configuring the UE7, the comb number of the UE6 is 3, and the comb number of the UE7 is 2. In the embodiment shown in FIG. 7, the length of the second basic block for configuring the UE7 may be 1 RB. Accordingly, the length of the first basic block for configuring the UE6 may be 2 RBs. Alternatively, the comb number of the SRS of the first type of UE and the comb number of the SRS of the second type of UE may be relatively prime, such that not all subcarriers simultaneously carry the SRS of the first type of UE and the second type of UE, but there may be subcarriers that carry the SRS of the first type of UE and the SRS of the second type of UE, respectively, so as to achieve interference randomization processing between the SRSs of different UEs, which is beneficial to the subsequent channel estimation of the SRS of each UE by the base station. For example, the comb number of the SRS of the first type of UE may take a value of 3 or 5 and so on, and the comb number of the SRS of the second type of UE may take a value of 2 or 4 and so on, which is relatively prime with the value of 3 or 5.

In another embodiment of the present invention, when the basic structural unit of the transmission of the SRS in the frequency domain is the first basic block or the second basic block, the SRS transmission sequence of each basic block may be constructed based on a ZC sequence of different given lengths. For example, the first basis block uses the ZC sequence of length 61, and the second basis block uses the ZC sequence of length 31. The SRS transmission sequence on each basis block may be obtained by cyclic shifting of the ZC sequence.

In another embodiment of the present invention, under the premise that the basic structural unit of the transmission of the SRS in the frequency domain is the basic block, when there are a plurality of first type of UEs, the SRSs of the respective first type of UEs may be orthogonal to each other. The lengths and/or numbers of the basic blocks configuring the plurality of first type of UEs may be the same as or different from each other. In addition, when there are a plurality of second type of UEs, the SRSs of the respective second type of UEs may be orthogonal to each other. Likewise, the lengths and/or numbers of the basic blocks configuring the plurality of second type of UEs may also be the same as or different from each other.

In the above-described example of configuring the SRS according to the basic block, the configuration information of the SRS configured by the generating unit 1010 may include information such as the length of the basic block of the SRS, the number of basic blocks, and/or the interval information indicating the comb number. After receiving the SRS configuration information transmitted by the base station, the UE may transmit the SRS according to the configured corresponding SRS reference signal sequence. The base station may transmit the SRS configuration information through higher layer signaling (such as RRC, MAC CE) or physical layer signaling (lower layer control information). In another embodiment of the present invention, the base station may select a configuration manner of the SRS reference signal sequence according to the SRS bandwidth type of the UE. For example, for narrowband SRS, the base station may select a shorter root sequence to configure the SRS, for example, a ZC (Zadoff-Chu) sequence of length 31 used in LTE may be selected; and for wideband SRS, the base station may select a longer root sequence, for example, a ZC sequence of length 61, to configure the SRS. The actually transmitted sequence may be obtained by cyclic shifting (CS) based on the ZC sequence of the above length.

In another embodiment of the present invention, the SRS of the UE configured by the generating unit 1010 may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the triggering by the base station, the corresponding UE transmits the SRS only once.

The transmitting unit 1020 transmits the SRS configuration information of the at least two UEs.

After the transmitting unit 1020 transmits the SRS configuration information to the at least two UEs, the corresponding UE may transmit the SRS according to the SRS configuration information, so that the base station carries out the channel estimation. Since the SRSs of different UEs are non-orthogonal in the embodiments of the present invention, the base station may cause an estimating unit (not shown) to carry out the channel estimation for the received SRSs of the at least two UEs with the successive interference cancellation (SIC) method after a receiving unit (not shown) receiving the SRSs of the at least two UEs, thereby improving the accuracy of the estimation. For example, the estimating unit may first estimate the SRS of the first type of UE, and delete the SRS of the first type of UE after the estimation, and then estimate the SRS of the second type of UE. When there are a plurality of first type of UEs or a plurality of second type of UEs, in the process of channel estimating by the base station, the SRSs of different UEs may be deleted one by one according to the quality of the received signal.

The base station according to the embodiments of the present invention may configure the SRS reference signal sequence of at least two UEs to be non-orthogonal, so that more UEs may be allowed to transmit SRS for channel measurement with given channel resources, thereby effectively improving the capacity of the SRS.

Hereinafter, a UE according to embodiments of the present invention will be described with reference to FIG. 11. The UE may perform the above SRS transmission method. Since the operation of the UE is substantially the same as the steps of the SRS transmission method described in FIG. 8, only a brief description thereof will be made herein, and a repeated description of the same content will be omitted.

Figure 11:
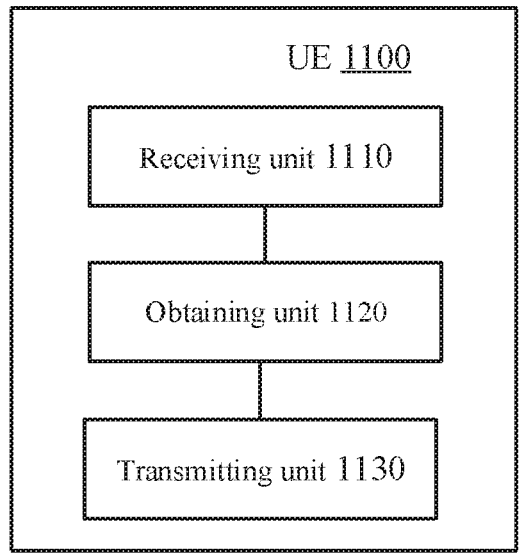
FIG. 11 shows a block diagram of a structure of a UE according to one embodiment of the present invention.

As shown in FIG. 11, a UE 1100 may include a receiving unit 1110, an obtaining unit 1120, and a transmitting unit 1130. It will be appreciated that FIG. 11 only shows components related to embodiments of the present invention, while other components are omitted, but this is merely illustrative, and the UE 1100 may include other components as needed.

The receiving unit 1110 receives the SRS configuration information transmitted by the base station.

The obtaining unit 1120 obtains an SRS configuration of the UE from the SRS configuration information, wherein an SRS of the UE is non-orthogonal with SRSs of other UEs.

In the SRS configuration information transmitted by the base station, the base station may achieve the purpose of improving the SRS capacity in a case of given channel resources by configuring the SRS of at least two UEs so that the SRS of the UE is non-orthogonal with the SRSs of other UEs. Specifically, the SRS of the UE and the SRS of other UEs may be partially orthogonal, that is, the subcarriers that transmit the SRS of UE may partially overlap with the subcarriers that transmit the SRSs of other UEs.

In one embodiment of the present invention, the SRS of the UE may be a wideband SRS, of course, also may be a narrowband SRS. When the SRS of the UE is the wideband SRS, the SRS of the other UEs may be the narrowband SRSs; and when the SRS of the UE is the narrowband SRS, the SRS of the other UEs may be the wideband SRSs. The wideband and narrowband in the embodiments of the present invention are relative concepts. For example, a preset threshold may be used to distinguish between a wideband SRS and a narrowband SRS, that is, an SRS whose bandwidth is greater than the preset threshold is treated as the wideband SRS, and an SRS whose bandwidth is less than or equal to the preset threshold is treated as the narrowband SRS. In another embodiment of the present invention, the bandwidth of the wideband SRS may be a multiple of the bandwidth of the narrowband SRS, for example, the bandwidth of the wideband SRS may be twice or four times the bandwidth of the narrowband SRS.

The transmitting unit 1130 transmits the SRS of the UE according to the SRS configuration information.

The transmitting unit 1130 may transmit the SRS according to a SRS reference signal sequence corresponding to the SRS configuration information. As described above, the configuration of the SRS reference signal sequence by the base station may be notified to the UE by the base station in advance, or may be written in a standard or transmitted with a signaling, so that the UE learns the configured corresponding SRS reference signal sequence.

The UE according to the embodiments of the present invention may enable the base station to configure the SRS reference signal sequence of at least two UEs to be non-orthogonal, so that more UEs may be allowed to transmit SRS for channel measurement with given channel resources, thereby effectively improving the capacity of the SRS.

Hereinafter, a UE according to embodiments of the present invention will be described with reference to FIG. 12. The UE may perform the above SRS transmission method. Since the operation of the UE is substantially the same as the steps of the SRS transmission method described in FIG. 9, only a brief description thereof will be made herein, and a repeated description of the same content will be omitted.

Figure 12:
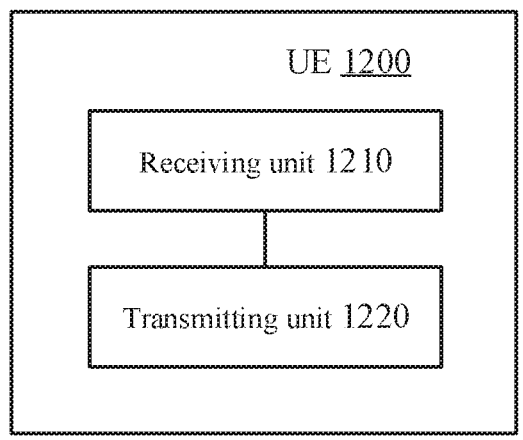
FIG. 12 shows a block diagram of a structure of a UE according to another embodiment of the present invention.

As shown in FIG. 12, a UE 1200 may include a receiving unit 1210 and a transmitting unit 1220. It will be appreciated that FIG. 12 only shows components related to embodiments of the present invention, while other components are omitted, but this is merely illustrative, and the UE 1200 may include other components as needed.

The receiving unit 1010 receives SRS configuration information transmitted by a base station, the SRS configuration information including information about basic blocks included in an SRS of the UE.

When the basic structural unit of the transmission of the SRS in the frequency domain is the basic block, bandwidth information in the SRS configuration information of the UE configured by the base station may include the information of the basic block included in the SRS, and specifically, may include a length of the basic block, and the number of basis blocks. At this time, the base station may determine a SRS reference signal sequence of the corresponding one or more UEs according to the determined length of the basic block and the number of basic blocks. For example, the base station may self-configure the SRS reference signal sequence of the UE according to the length and the number of the basic block(s), and notify the UE. Alternatively, the receiving unit 1010 may directly transmit the SRS according to the preset sequence configuration corresponding to the length and the number of the basic block(s). The length of the basic block or the configuration of the preset SRS reference signal sequence may be notified to the UE by the base station in advance, or may be written in a standard or transmitted with a signaling. For example, when a length type of the basic block has been preset in the SRS configuration, an instruction corresponding one to one to the length type of the basic block (such as the configuration ID) needs to be used to indicate the length of the basic block.

In another embodiment of the present invention, when the SRS is configured according to a basic block unit, the length of the basic block may be the same as or different from the length of the time-frequency resource unit, for example, the length of one basic block may include one or more time-frequency resource units. Of course, the length of the basic block may be the same as or different from the resource block (RB). For example, one basic block may be one RB, or may be an integer multiple of RB.

In one example of the present invention, the configuration information of the SRS configured by the base station may include not only the length of the basic block of the SRS, the number of basic blocks, but also information such as the interval information indicating the comb number. The base station may transmit the SRS configuration information through higher layer signaling (such as RRC, MAC CE) or physical layer signaling (lower layer control information).

In another embodiment of the present invention, the SRS of the UE configured by the base station may be a periodic SRS or an aperiodic SRS. When the SRS is the periodic SRS, the SRS configuration information may further include information such as a transmitting period of the SRS. When the SRS is the aperiodic SRS, the base station will trigger the SRS transmission through the physical downlink control channel PDCCH. After the base station triggering, the corresponding UE transmits the SRS only once.

The transmitting unit 1220 transmits the SRS of the UE according to the SRS configuration information.

After the receiving unit 1210 receives the SRS configuration information transmitted by the base station, the transmitting unit 1220 may transmit the SRS according to the corresponding SRS reference signal sequence. As described above, the configuration of the SRS reference signal sequence by the base station may be notified to the UE by the base station in advance, or may be written in a standard or transmitted with a signaling, so that the UE learns the configured corresponding SRS reference signal sequence.

The UE according to the embodiments of the present invention may enable the base station to configure the SRS reference signal sequence of at least two UEs to be non-orthogonal, so that more UEs may be allowed to transmit SRS for channel measurement with given channel resources, thereby effectively improving the capacity of the SRS.

Additionally, block diagrams used for the illustration of the above embodiments represent functional blocks in functional units. These functional blocks (components) are realized by any combination of hardware and/or software. In addition, the means for implementing the respective function blocks is not particularly limited. That is, the respective functional blocks may be realized by one apparatus that is physically and/or logically aggregated; or more than two apparatuses that are physically and/or logically separated may be directly and/or indirectly (e.g., wiredly and/or wirelessly) connected, and the respective functional blocks may be implemented by these apparatuses.

Figure 13:
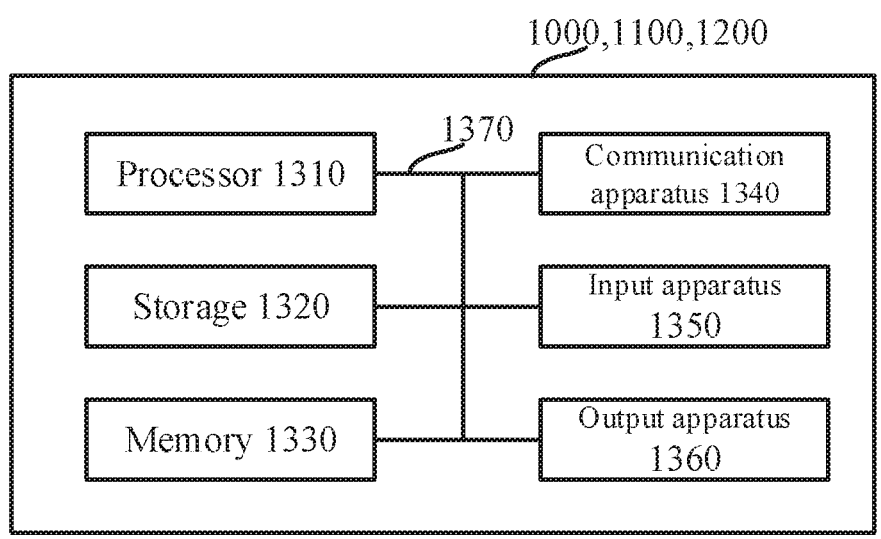
FIG. 13 shows a diagram of an example of a hardware configuration of a base station or a UE according to one embodiment of the present invention.

For example, the base station 1000, UE 1100 or UE 1200 in an embodiment of the present invention can function as a computer that carries out the processes of the wireless communication method of the present invention. FIG. 13 is a diagram that shows an example of a hardware structure of the base station or the UE according to an embodiment of the present invention. The above described base station 1000, UE 1100 or UE 1200 may be physically constituted as a computer apparatus including a processor 1301, a memory 1302, a storage 1303, a communication apparatus 1304, an input apparatus 1305, an output apparatus 1306, a bus 1307 and so on.

It should be noted that, in the following description, the term "apparatus" may be interpreted as a circuit, a device, a unit or the like. The hardware constitution of the base station 1000, UE 1100 or UE 1200 may include one or more apparatuses shown in the figure, or may not include a part of the apparatuses.

For example, although only one processor 1301 is shown, a plurality of processors may be provided. Furthermore, processes may be performed by one processor, or processes may be performed either simultaneously or in sequence, or in different manners, by two or more processors. Additionally, the processor 1301 may be installed with one or more chips.

Respective functions of the base station 1000, UE 1100 or UE 1200 are implemented by, for example, reading predetermined software (program) onto hardware such as the processor 1301 and the memory 1302, so as to make the processor 1301 perform calculations, controlling the communication carried out by the communication apparatus 1304, and controlling the reading and/or writing of data in the memory 1302 and the storage 1303.

The processor 1301 may control the whole computer by, for example, running an operating system. The processor 1301 may be configured with a central processing unit (CPU), which includes interfaces with peripheral apparatus, a control apparatus, a computing apparatus, a register and so on.

Furthermore, the processor 1301 reads programs (program codes), software modules, data or the like, from the storage 1303 and/or the communication apparatus 1304, into the memory 1302, and executes various processes according to them. As the programs, programs to allow a computer to execute at least part of the operations described in the above-described embodiments may be used.

The memory 1302 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1302 may be referred to as a "register", a "cache", a "main memory" (primary storage apparatus) and so on. The memory 1302 can store executable programs (program codes), software modules and so on for implementing the radio communication methods according to embodiments of the present invention.

The storage 1303 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1303 may be referred to as a secondary storage apparatus.

The communication apparatus 1304 is hardware (transmitting/receiving device) for allowing inter-computer communication by using wired and/or wireless networks, and may be referred to as, for example, a network device, a network controller, a network card, a communication module and so on. The communication apparatus 1304 may be configured to include a high frequency switch, a duplexer, a filter, a frequency synthesizer and so on in order to realize, for example, frequency division duplex (FDD) and/or time division duplex (TDD).

The input apparatus 1305 is an input device for receiving input from the outside (for example, a keyboard, a mouse, a microphone, a switch, a button, a sensor or the like). The output apparatus 1306 is an output device for implementing output to the outside (for example, a display, a speaker, an LED (Light Emitting Diode) lamp, or the like). It should be noted that the input apparatus 1305 and the output apparatus 1306 may be provided in an integrated structure (for example, a touch panel).

Furthermore, these apparatus, including the processor 1301, the memory 1302 and so on are connected by the bus 1307 for communicating information. The bus 1307 may be formed with a single bus, or may be formed with buses that vary between apparatus.

Also, the base station 1000, UE 1100 or UE 1200 may include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1301 may be installed with at least one of these pieces of hardware.

It should be noted that the terms illustrated in the present specification and/or the terms required for the understanding of the present specification may be substituted with terms having the same or similar meaning. For example, a channel and/or a symbol may be a signal (signaling). In addition, the signal may be a message. A reference signal may be abbreviated as a RS (Reference Signal), and may be referred to as a pilot, a pilot signal and so on, depending on the standard applied. In addition, a component carrier (CC) may be referred to as a carrier frequency, a cell, a frequency carrier, or the like.

Furthermore, a slot may be comprised of one or more symbols (OFDM (Orthogonal Frequency Division Multiplexing) symbols, SC-FDMA (Single Carrier Frequency Division Multiple Access) symbols, or the like) in the time domain. Furthermore, the slot may also be a time unit configured based on a parameter. Furthermore, a slot may also include multiple micro-slots. Each micro-slot may be comprised of one or more symbols in the time domain. Furthermore, a micro-slot may also be referred as a sub-slot.

A radio frame, a subframe, a slot, a micro-slot and a symbol all represent the time unit when transmitting signals. A radio frame, a subframe, a slot, a micro-slot and a symbol may also use other names that correspond to them. For example, one subframe may be referred to as a transmission time interval (TTI), a plurality of consecutive subframes may also be referred to as a TTI, and one slot or one micro-slot may also be referred to as a "TTI." That is, the subframe and/or the TTI may be a subframe (1 ms) in existing LTE, may be a shorter period of time than 1 ms (for example, one to thirteen symbols), or may be a longer period of time than 1 ms. It should be noted that a unit indicating the TTI may also be referred to as a slot, a micro-slot, or the like instead of a subframe.

Here, the TTI refers to a minimum time unit of scheduling in radio communication, for example. For example, in LTE systems, a radio base station performs, for respective user equipment, the scheduling to assign radio resources (such as frequency bandwidths and transmission powers that can be used in the respective user equipment) in a unit of TTI. It should be noted that the definition of the TTI is not limited to this.

The TTI may be a transmission time unit for a channel-coded data packet (data block), a code block, and/or a codeword, or may be a processing unit for scheduling, link adaptation and so on. It should be noted that, when a TTI is given, a time interval (e.g., the number of symbols) actually mapped to a data block, a code block, and/or a codeword may be shorter than the TTI.

It should be noted that, when one slot or one micro-slot is called a TTI, more than one TTI (i.e., more than one slot or more than one micro-slot) may become a minimum time unit for scheduling. Furthermore, the number of slots (the number of micro-slots) constituting the minimum time unit for scheduling may be controlled.

A TTI having a time duration of 1 ms may be referred to as a normal TTI (TTI in LTE Rel. 8 to 12), a standard TTI, a long TTI, a normal subframe, a standard subframe, or a long subframe, or the like. A TTI that is shorter than a normal TTI may be referred to as a shortened TTI, a short TTI, a partial (or fractional) TTI, a shortened subframe, a short subframe, a micro-slot, a short micro-slot, or the like.

It should be noted that, a long TTI (e.g., a normal TTI, a subframe, etc.) may be replaced with a TTI having a time duration exceeding 1 ms, and a short TTI (e.g., a shortened TTI, etc.) may also be replaced with a TTI having a TTI duration which is shorter than that of the long TTI and exceeds 1 ms.

A resource block (RB) is a unit of resource allocation in the time domain and the frequency domain, and may include one or a plurality of consecutive subcarriers in the frequency domain. Also, an RB may include one or more symbols in the time domain, and may be one slot, one micro-slot, one subframe or one TTI duration. One TTI and one subframe each may be comprised of one or more resource blocks, respectively. It should be noted that one or more RBs may also be referred to as a physical resource block (PRB (Physical RB)), a SubCarrier Group (SCG), a Resource Element Group (REG), a PRG pair, an RB pair, and so on.

It should be noted that the above-described structures of radio frames, subframes, slots, micro-slots, symbols and so on are simply examples. For example, configurations such as the number of subframes included in a radio frame, the number of slots of each subframe or radio frame, the number or micro-slots included in a slot, the number of symbols and RBs included in a slot or micro-slot, the number of subcarriers included in an RB, the number of symbols in a TTI, the symbol length, the cyclic prefix (CP) length and so on can be variously changed.

Also, the information, parameters and so on described in this specification may be represented in absolute values or in relative values with respect to predetermined values, or may be represented in other corresponding information. For example, radio resources may be indicated by predetermined indices. In addition, equations to use these parameters and so on may be different from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols, chips and so on, which may be referenced throughout the herein-contained description, may be represented by voltages, currents, electromagnetic waves, magnetic fields or particles, optical fields or photons, or any combination of them.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a management table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of them.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC message", and can be, for example, an RRC connection setup message, RRC connection reconfiguration message, and so on. Also, MAC signaling may be reported using, for example, MAC control elements (MAC CE (Control Element)).

Also, reporting of predetermined information does not necessarily have to be carried out explicitly, and can be carried out implicitly (by, for example, not reporting this piece of information, or by reporting a different piece of information).

Regarding decisions, they may be made by values represented by one bit (0 or 1), may be made by a true or false value (Boolean value) represented by true or false, or may be made by comparison of numerical values (for example, comparison against a predetermined value).

Software, whether referred to as software, firmware, middleware, microcode or hardware description language, or called by other names, should be interpreted broadly, to mean commands, command sets, codes, code segments, program codes, programs, subprograms, software modules, applications, software applications, software packages, routines, subroutines, objects, executable files, execution threads, steps, functions and so on.

Also, software, commands, information and so on may be transmitted or received via transmission media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of transmission media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. A base station may be referred to as a "fixed station", "NodeB", "eNodeB (eNB)", "access point", "transmission point", "receiving point", "femto cell", "small cell" and so on.

Sometimes a user terminal is also called by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be replaced by user equipment. For example, each aspect/embodiment of the present invention may be applied to a configuration in which communication between a radio base station and a user equipment is replaced with communication among a plurality of user equipment (D2D (Device-to-Device)). In this case, user equipment 20 may have the functions of the radio base stations 10 described above. In addition, terms such as "uplink" and "downlink" may be replaced by "side." For example, an uplink channel may be replaced by a side channel.

Likewise, the user equipment in this specification may be replaced by radio base stations.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on) other than base stations, or combinations of them.

The respective aspects/embodiments illustrated in this specification may be used individually or in combinations, or may be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G (Super 3th generation mobile communication system), IMT-Advanced (International Mobile Telecommunications-Advanced), 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other proper radio communication methods, and/or next-generation systems that are enhanced based on them.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, regarding "judging (determining)", calculating, computing, processing, deriving, investigating, looking up (for example, looking up a table, a database or some other data structure), ascertaining and so on may be considered as "judging (determining)". Furthermore, regarding "judging (determining)", receiving (for example, receiving information), transmitting (for example, transmitting information), inputting, outputting, accessing (for example, accessing data in a memory) and so on may be considered as "judging (determining)". In addition, regarding "judging (determining)", resolving, selecting, choosing, establishing, comparing and so on may be considered as "judging (determining)". In other words, regarding "judging (determining)", some actions may be considered as "judging (determining)".

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of them. For example, "connection" may be replaced as "access." As used herein, two elements may be considered "connected" or "coupled" to each other by using one or more electrical wires, cables and/or printed electrical connections, and, as a number of non-limiting and non-inclusive examples, by using electromagnetic energy having wavelengths in radio frequency fields, microwave regions and/or optical (both visible and invisible) regions.

When terms such as "include", "comprise" and variations of them are used in this specification or in claims, these terms are intended to be inclusive, in a manner similar to the way the term "provide" is used. Furthermore, the term "or" as used in this specification or in claims is intended to be not an exclusive disjunction.

Although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A base station, comprising:
   a generating unit, configured to generate sounding reference signal (SRS) configuration information for at least two UEs, such that an SRS of a first type of UE of the at least two UEs is non-orthogonal with an SRS of a second type of UE of the at least two UEs; and
   a transmitting unit, configured to transmit the SRS configuration information of the at least two UEs,
   wherein the SRS configuration information includes: interval information indicating a comb number of the SRS.

2. The base station of claim 1, wherein a bandwidth of the first type of UE is greater than a bandwidth of the second type of UE.

3. The base station of claim 1, wherein the comb number indicated by the interval information of the first type of UE is different from the comb number indicated by the interval information of the second type of UE.

4. The base station of claim 1, wherein when a plurality of first type of UE are included in the at least two UEs, SRSs of the respective first type of UE are orthogonal.

5. The base station of claim 1, wherein when a plurality of second type of UE are included in the at least two UEs, SRSs of the respective second type of UE are orthogonal.

6. The base station of claim 1, wherein the generating unit generates, according to information of basic blocks, SRS configuration information of any one or more UEs of the at least two UEs, wherein the basic blocks include time-frequency resource units.

7. The base station of claim 6, wherein the SRS configuration information further includes: a length of the basis blocks and/or the number of the basis blocks.

8. The base station of claim 6, wherein when SRSs of the first type of UEs and the second type of UEs are all configured according to the basic blocks, a length of a first basis blocks for configuring the SRS of the first type of UE is different from a length of a second basis block for configuring the SRS of the second type of UE; and/or, the number of the first basic blocks is different from the number of the second basic blocks.

9. The base station of claim 1, wherein the base station further includes: a receiving unit, configured to receive the SRSs of the at least two UEs; an estimating unit configured to carry out channel estimation for the received SRSs of the at least two UEs with a successive interference cancellation method.

10. A User Equipment (UE), comprising:

a receiving unit, configured to receive sounding reference signal (SRS) configuration information transmitted by a base station;

an obtaining unit, configured to obtain an SRS configuration of the UE from the SRS configuration information, wherein an SRS of the UE is non-orthogonal with SRSs of other UEs; and a transmitting unit, configured to transmit the SRS of the UE according to the SRS configuration information, wherein the SRS configuration information includes: interval information indicating a comb number of the SRS.

11. A User Equipment (UE), comprising:

a receiving unit, configured to receive sounding reference signal (SRS) configuration information transmitted by a base station, the SRS configuration information including information about basic blocks included in an SRS of the UE; and a transmitting unit, configured to transmit the SRS of the UE according to the SRS configuration information, wherein the SRS configuration information includes: interval information indicating a comb number of the SRS.

* * * * *